(12) United States Patent
Wang et al.

(10) Patent No.: US 8,595,655 B2
(45) Date of Patent: Nov. 26, 2013

(54) METHOD AND SYSTEM FOR LITHOGRAPHIC SIMULATION AND VERIFICATION

(75) Inventors: Fei Wang, Boise, ID (US); William A. Stanton, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 576 days.

(21) Appl. No.: 12/878,569

(22) Filed: Sep. 9, 2010

(65) Prior Publication Data

US 2011/0010677 A1   Jan. 13, 2011

Related U.S. Application Data

(62) Division of application No. 11/773,118, filed on Jul. 3, 2007, now Pat. No. 7,818,710.

(51) Int. Cl.
    *G06F 17/50* (2006.01)
(52) U.S. Cl.
    USPC .......... 716/50; 716/51; 716/52; 716/53; 716/54; 716/55; 716/56
(58) Field of Classification Search
    USPC .................................. 716/50–56
    See application file for complete search history.

(56) References Cited

U.S. PATENT DOCUMENTS

| | | | |
|---|---|---|---|
| 4,651,284 A | 3/1987 | Watanabe et al. | |
| 6,178,360 B1 | 1/2001 | Pierrat et al. | |
| 6,653,026 B2 | 11/2003 | Pierrat et al. | |
| 6,757,645 B2 | 6/2004 | Chang et al. | |
| 7,155,689 B2 | 12/2006 | Pierrat et al. | |
| 7,191,428 B2 | 3/2007 | Tang et al. | |
| 7,568,179 B1 * | 7/2009 | Kroyan et al. | 716/51 |
| 7,921,383 B1 * | 4/2011 | Wei | 716/54 |
| 2003/0140330 A1 * | 7/2003 | Tanaka et al. | 716/19 |
| 2004/0265707 A1 | 12/2004 | Socha | |
| 2005/0015233 A1 * | 1/2005 | Gordon | 703/13 |
| 2005/0076316 A1 * | 4/2005 | Pierrat et al. | 716/4 |
| 2006/0248497 A1 * | 11/2006 | Huang et al. | 716/21 |
| 2009/0012769 A1 | 1/2009 | Wang et al. | |
| 2009/0053621 A1 | 2/2009 | Socha | |
| 2009/0265680 A1 * | 10/2009 | Izuha et al. | 716/21 |
| 2010/0275178 A1 * | 10/2010 | Wei | 716/56 |
| 2011/0145769 A1 * | 6/2011 | Wei | 716/56 |

OTHER PUBLICATIONS

"Micron Selects Synopsys' SiVL DFM Solution for 90nm Production", http://www.embeddedstar.com/press/content/2004/11/embedded17260.html, (Nov. 18, 2004).

Alvarez-Gomariz, Husayn, et al., "Method and Device for Checking Lithography", U.S. Appl. No. 11/423,082, filed Jun. 8, 2006.

(Continued)

*Primary Examiner* — Stacy Whitmore
(74) *Attorney, Agent, or Firm* — Schwegman, Lundberg & Woessner, P.A.

(57) ABSTRACT

Methods and systems for lithographic simulation and verification comprising a process in the frequency domain or in the spatial domain of calculating intensity at a location (x, y) for a number of defocus values. In addition, evaluating the intensity calculation result to determine if the intensity level will result in the mask pattern being written onto a wafer. The verification process may be calculated in the spatial domain or in the frequency domain. The calculations may be done such that full focus window calculations may be obtained by isolating the defocus parameter "z" in the calculations.

18 Claims, 6 Drawing Sheets

(56) References Cited

OTHER PUBLICATIONS

Chiou, S. Y., et al., "Behind the Mask: Implementing simulation-based mask-qualification technology", http://www.micromagazine.com/archive/02/02/lei.html, (2002).

Gennari, Frank, "Optical Proximity Correction (OPC)", http://www.cs.berkeley.edu/~ejr/GSI/cs267-s04/homework-0/results/gennari/, (Jan. 28, 2004).

Tirapu-Azpiroz, Jaione, et al., "Fast evaluation of photomask near-fields in subwavelength 193-nm lithography", Proceedings of SPIE—vol. 5377, Optical Microlithography XVII, Bruce W. Smith, Editor, (May 2004), 1528-1535.

Wang, Fei, et al., "Reduced Lens Heating Methods, Apparatus, and Systems", U.S. Appl. No. 11/729,554, filed Mar. 29, 2007.

Wiley, Jim, "Future challenges in computational lithography", http://sst.pennnet.com/Articles/Article_Display.cfm?Section=HOME&ARTICLE_ID=254908&VERSION_NUM=2&p=5, Solid State Technology, (May 2006).

Wong, Alfred, "Chapter 2—Optical Imaging and Resolution", In: Resolution Enhancement Techniques in Optical Lithography, SPIE Publications, (2001), 31-70.

Yu, Peng, et al., "Fast Lithography Simulation under Focus Variations for OPC and Layout Optimizations", Proceedings of SPIE—vol. 6156, Design and Process Integration for Microelectronic Manufacturing IV, 2006.

Alfred K. K. Wong, Vivek K. Singh, Editors, (Mar. 14, 2006), 615-618.

\* cited by examiner

METHOD AND SYSTEM FOR LITHOGRAPHIC SIMULATION AND VERIFICATION

RELATED APPLICATION

This application is a Divisional of U.S. application Ser. No. 11/773,118, filed Jul. 3, 2007 now U.S. Pat. No. 7,818,710, which is incorporated herein by reference in its entirety.

TECHNICAL FIELD

Various embodiments described herein relate to lithographic fabrication methods and systems. Various embodiments described relate generally to methods and systems for lithographic simulation.

BACKGROUND

Photolithography is a fabrication technique that is employed for use in a number of industries, including the semiconductor processing industry. Specifically, photolithography uses an energy source such as ultraviolet (UV) light, x-ray wavelength, other wavelengths of radiation, etc. to expose selected regions of a surface. In one common technique, the surface includes a semiconductor wafer such as silicon that has been coated with a resist material. The resist material properties are locally changed when exposed to the energy source, which allows selected regions of the resist material to remain, while unwanted regions of the resist material are removed.

In one method of photolithography, a pattern of features is created on a reticle or mask, and the pattern on the reticle is focused onto a semiconductor surface using optics that adjust the scale of the pattern on the reticle to fit the semiconductor surface. In the semiconductor industry, there is an ever present pressure to reduce the size of features in the pattern to increase the density of patterned features packed into the same semiconductor surface area. In one example industry, manufacturers of random access memory chips such as dynamic random access memory (DRAM) strive to put more storage cells onto a single chip.

As feature size decreases, photolithography of smaller and smaller features becomes more and more difficult. One of the key parameters in lithography is the focal parameter. During processing of a wafer several factors may cause variations in the focal parameter of the lithographic system. These factors may include lens heating, non-planarity of the wafer, wafer tilt or lens aberrations, among others. At sub-wavelength geometries, it is necessary to verify that each mask design prints as expected before it goes through mask manufacturing and wafer production. To assure the wafer manufacturer that the mask as designed will produce flawless wafers, silicon designers have developed simulation software to predict the results of the wafer fabrication. For example, Synopsys' SiVL (Silicon vs. Layout Verification Tool) software is an industry leader in design for manufacturability (DFM) software. Other software tools include simulation engines for Optical Proximity Correction (OPC) and Resolution Enhancement Techniques (RET).

Current simulation software may operate with individually generated defocus models and generate reports at each discrete defocus parameter. The time required to run a single simulation for a single defocus parameter is measured in hours and may take a full day depending on the layout size and complexity of the chip. Therefore, the number of defocus parameters that may be calculated is often limited due to time and resource restraints. Many times the calculations are limited to the outermost thresholds of defocus and a nominal defocus value, sometimes called best-focus value. This prevents the ability to run full-focus window simulations. In addition, defocus values other than the nominal one (i.e., the best-focus value) may result in the greatest errors and these errors may not be discovered until the wafer has already been run. As a result, a loss of significant resources and time may occur from the current simulation practices.

DETAILED DESCRIPTION

Figure 1:
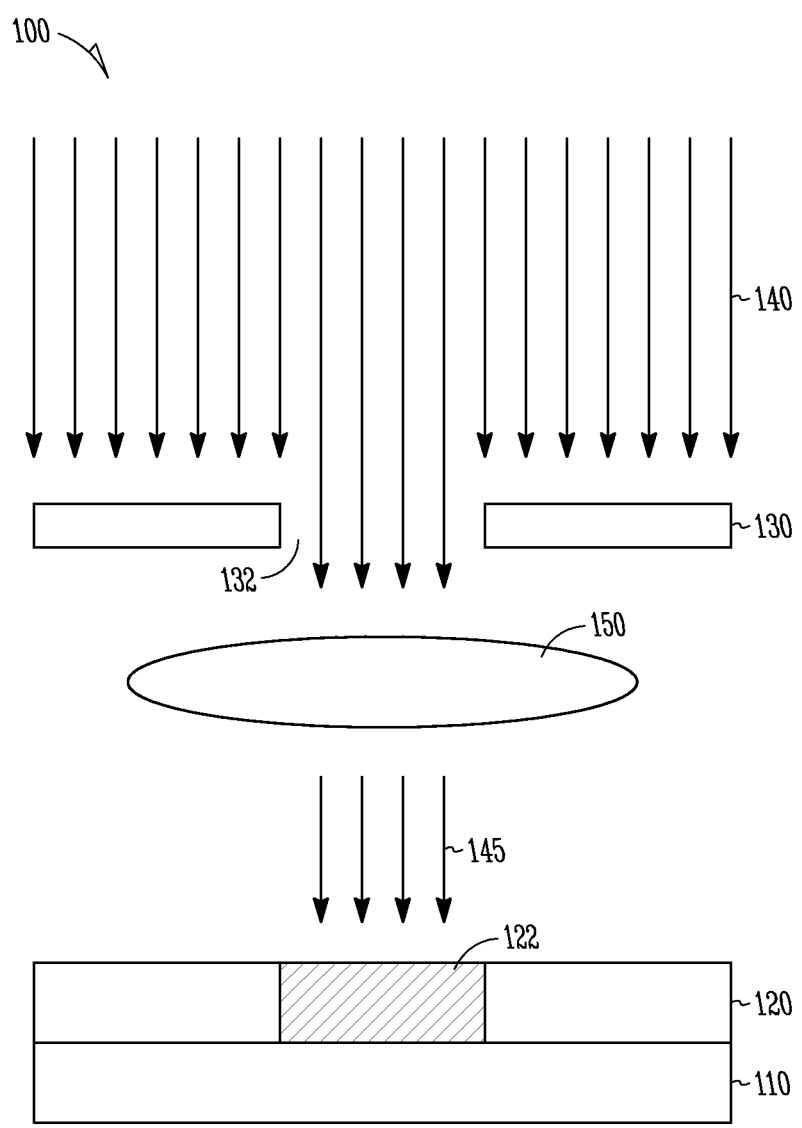
FIG. 1 shows a photolithographic system according to an embodiment of the invention.

In one embodiment, a pattern of features is formed on a reticle and the pattern is then transferred to a substrate by means of photolithography. In one embodiment the pattern of features includes semiconductor device component features, including, but not limited to, source/drain regions, transistor gates, trace lines, source/drain contacts, vias, capacitor plates, etc. FIG. 1 shows a photolithography system 100 according to an embodiment of the invention. The system 100 includes a substrate 110. In one embodiment, the substrate 110 includes a semiconductor substrate, such as a silicon wafer. Although a semiconductor substrate is discussed for illustration, embodiments of the invention will comprise other working surfaces utilizing photolithography.

A resist layer 120 is located over a surface of the substrate 110. A reticle 130 is shown with an aperture 132, and is spaced apart from the resist layer 120 by a focal length. The reticle 130 is shown in a simplified form with an energy blocking region and an aperture 132. In one embodiment, the reticle 130 further includes a layer that is substantially transparent, such as a glass. In one embodiment, the reticle 130 further includes an attenuated and partly opaque portion adapted to block a portion of an energy source 140 or to phase shift a portion of the energy source 140. The terms "transparent", "attenuated", "partly opaque" and other associated optical terms in the present specification refer to optical properties of the reticle 130. Possible energy sources include, but are not limited to, UV radiation and x-ray radiation. One source of suitable energy is from a laser light source.

The energy source 140 is directed toward the resist layer 120, with a portion of the energy source 140 being blocked by the reticle 130. A portion of the energy source 140 is shown passing through the aperture 132 in the reticle 130 and toward projection optics 150. Projection optics 150 may be utilized to focus and scale the energy source 140 that passes through the aperture 132. Projection optics 150 may comprise one lens or up to and more than 40 lens elements. Projection optics 150 may be used to scale the energy 140 to smaller features than is possible with reticle 130 alone, thus allowing focused energy source 145 to write smaller features onto the resist layer 120. The focused energy source 145 is shown contacting the resist layer 120 in a selected region 122. The selected region 122 interacts with the focused energy source 145 to selectively alter the resist material properties of resist layer 120. Two possible interactions include a curing of the resist material and a weakening of the resist material. In one possibility, the resist layer 120 in the selected region 122 is cured and remains while the non-selected region of the resist layer 120 is removed. In another possibility, the resist layer 120 in the selected region 122 is weakened and is removed while the non-selected region of the resist layer remains.

Figure 2:
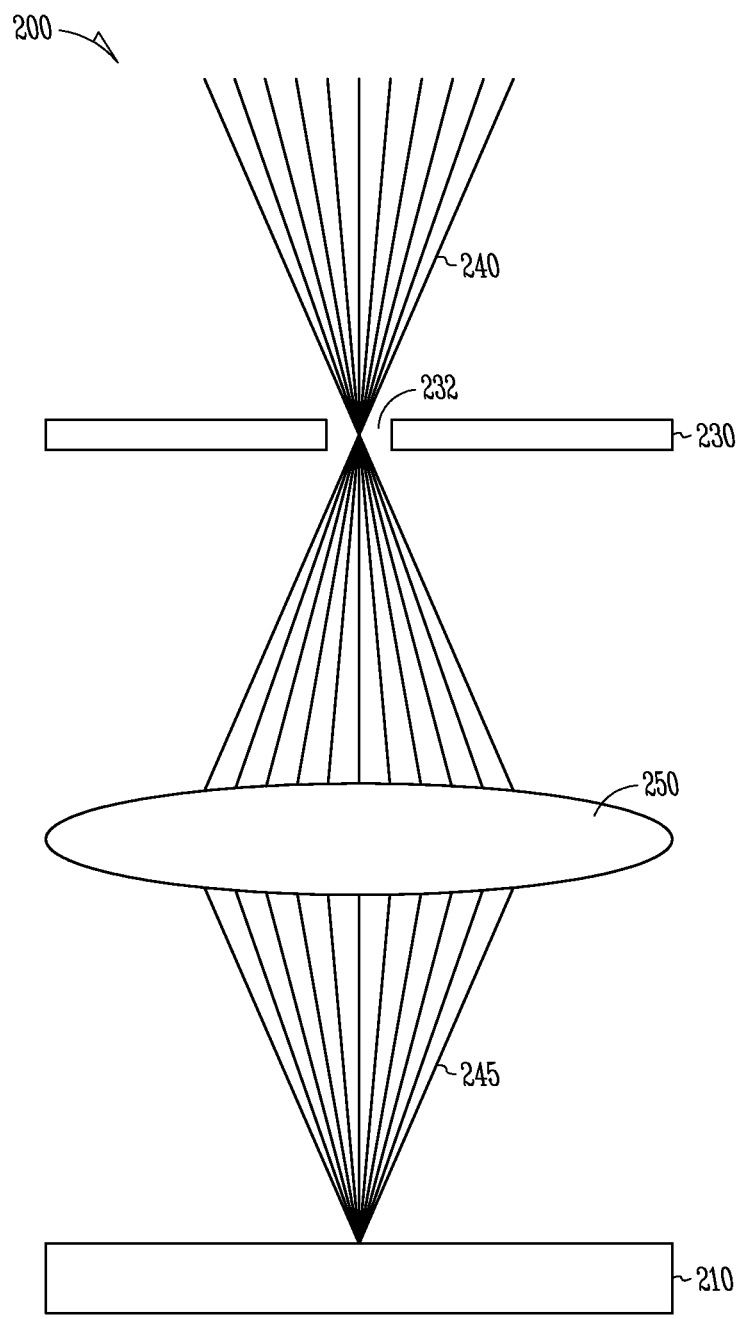
FIG. 2 illustrates a partially coherent photolithographic system according to an embodiment of the invention.

FIG. 2 illustrates a partially coherent photolithography system according to an embodiment of the invention. As with FIG. 1, an energy source 240 provides light or energy to the system 200. Energy source 240 may not be coherent, or may be partially coherent, requiring the use of projection optics 250 to convert energy source 240 into a focused energy beam 245 which is projected onto a substrate 210. As with FIG. 1, projection optics 250 may include one or more lenses. Possible energy sources include, but are not limited to, UV radiation and x-ray radiation. A reticle 230, also known as a photomask or mask, may be imposed with patterns or features that will be written onto substrate 210. Projection optics 250 is utilized to focus energy source 240 onto substrate 210 through the patterned features on reticle 230. In other words, the features on reticle 230 are transferred onto the substrate 210 by the energy source 240 through the projection optics 250. A portion of the energy source 240 is shown passing through an aperture 232 in the reticle 230 and being focused by projection optics 250 onto substrate 210. In addition to focusing energy source 240, projection optics 250 may be used to demagnify the image of the reticle 230 onto substrate 210. By demagnifying the image produced by a reticle 230, it is possible to shrink the image from reticle 230, allowing smaller elements to be imposed on substrate 210.

The intensity of the focused energy beam 245 on substrate 210 may determine if the critical dimensions of reticle 230 are imposed properly onto substrate 210. It is possible to predict the intensity on a substrate by utilizing the Hopkins' expression derived from Abbe's equation in the frequency domain. Hopkins' equation may be characterized as:

$$I(x,y) = \iiiint TCC(f_1,g_1,f_2,g_2)O(f_1,g_1)O^*(f_2,g_2)e^{-i2\pi[(f_1-f_2)x+(g_1-g_2)y]} df_1 dg_1 df_2 dg_2,$$

where $I(x, y)$ is the energy intensity at the location $(x, y)$ on the wafer plane, TCC is the so-called transmission cross coefficient, $O(f, g)$ is the mask spectrum or the Fourier transform of the reticle pattern $O(x, y)$, x and y are the spatial variables, and f and g are the spatial frequency variables. By predicting the intensity on the substrate, it is possible to determine if the resist at a given portion is exposed to light radiation sufficiently or insufficiently to allow the reticle pattern to be written properly at that resist portion. Since billions of features may be written on a single wafer and multiple wafers may be written from a mask, a defect in the mask may result in the loss of significant resources, not to mention the cost of time. For the semiconductor industry, time to market may be critical in determining the eventual success of a product.

The intensity of the focused energy beam 245 is affected by the defocus value of projection optics 250. As projection optics 250 moves out of nominal focus (i.e., the best-focus value), a defocus value "z" may be predicted and measured. When predicting the intensity at a location it is critical to determine the effect of defocus "z". To determine the effect of the defocus value on the projection optics 250 in the frequency domain, it is necessary to express the transmission cross coefficient as follows:

$$TCC(f_1,g_1,f_2,g_2)=\int J(f,g)K(f+f_1,g+g_1)K^*(f+f_2,g+g_2)M(f+f_1,g+g_1)M^*(f+f_2,g+g_2)dfdg.$$

In the above equation, $J(f, g)$ is the mutual intensity (effective source function), $M(f, g)$ is the polarization function modified to the bilinear form, and $K(f, g)$ is the pupil function, which is dependent on the defocus value "z" as shown below. In some cases, $K(f, g)$ takes the normalized form so that it is zero when $f^2+g^2$ is greater than one. Therefore, it is only necessary to solve for K when $f^2+g^2 \le 1$.

As shown below, the pupil function K in the frequency domain is dependent on the defocus value "z". NA is the numerical aperture and $k_0$ is the free space wavenumber.

$$K(f,g)=e^{ik_0 z NA^2(f^2+g^2)/2} \text{ when } f^2+g^2 \le 1$$

$$K(f,g)=0 \text{ when } f^2+g^2 > 1$$

Because $f^2+g^2$ is less than or equal to one, the Fourier expansion of $K(f, g)$ in the frequency domain may be expressed as:

$$K(f, g) = \sum_k i^k z^k (f^2 + g^2)^k \pi^k / k!$$

It is possible to express $K(f, g)$ in terms of a Fourier expansion since the norm of the function is no larger than 1. $I(x, y)$ in the frequency domain may now be expressed by substituting $K(f, g)$ into the Hopkins' equation above. Because $1/n!$ will converge to zero quickly and the normalized defocus value "z" is less than 1 in most cases of interest, it is possible to limit $N_{cut}$ to a small factor such as four (4) without significantly affecting the accuracy of the model; therefore, $$I(x, y) = \sum_{n=0}^{N_{cut}} \frac{(-i\pi)^n}{n!} z^n I_n(x, y).$$

Once a number of intensity components $I_n(x, y)$ have been calculated at positions of interest, calculating $I(x, y)$ for various values of z is relatively quick, thus allowing for multiple defocus parameters to be used when calculating $I(x, y)$. This gives the user the ability to calculate a full focus window for $I(x, y)$.

The more complex activity in the frequency domain is to solve the intensity component, $I_n(x, y)$. To solve $I_n(x, y)$ in the frequency domain, the formula below is utilized:

$$I_n(x,y)=\iiiint TCC(n)O(f_1,g_1)O^*(f_2,g_2)e^{-i2\pi[(f_1-f_2)x+(g_1-g_2)y]} f_1 dg_1 df_2 dg_2.$$

To solve $I_n(x, y)$ in the frequency domain, it may be necessary to determine TCC(n) in the frequency domain. TCC(n) may be obtained using the formula:

$$TCC(n) = \sum_{k=0}^{n} (-1)^k C_n^k \int [(f+f_1)^2 + (g+g_1)^2]^k [(f+f_2)^2 +$$

$$(g+g_2)^2]^{n-k} J(f,g) b \ln(K) b \ln(M) df dg.$$

In the above equation, TCC(n) is Hermitian for an even number of n, and TCC(n) is anti-Hermitian for odd numbers of n. It may be proved that both Hermitian and anti-Hermitian TCC may be decomposed into bilinear 2D kernel form through diagonalization. The difference is that the Hermitian TCC decomposition generates real valued eigenvalues, and the anti-Hermitian TCC's eigenvalues are purely imaginary. $C_n^k$ is found using the formula, $$C_n^k = \frac{n!}{k!(n-k)!}.$$

The calculations for the transmission cross coefficient component TCC(n) may be done by limiting $N_{cut}$ as discussed above to a number such as 4. Once a number of TCC(n) ($0 \le n \le N_{cut}$) results are calculated, the through-full-focus image calculations may be accelerated by calculating a number of intensity components ($I_n$) at each position of interest. The significant calculation time has now been moved to calculating the intensity component without regard for the defocus value. The defocus value now becomes a part of the final calculation of intensity at locations (x, y). By moving the defocus value to the final calculation, it allows the simulation to calculate intensity at several defocus values in a relatively short period of time once the intensity component values have been calculated.

Figure 3:
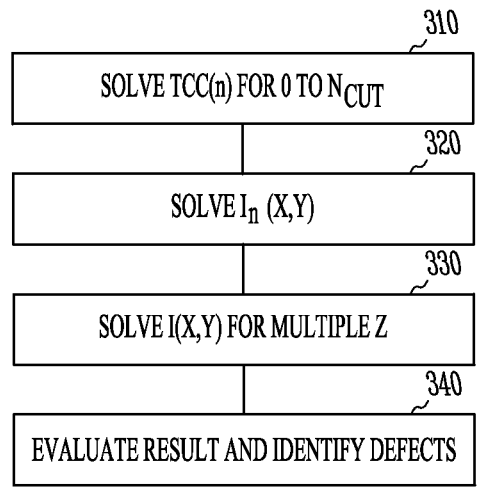
FIG. 3 shows a flow diagram of a method of determining the intensity at a location on a wafer utilizing the frequency domain according to an embodiment of the invention.

FIG. 3 shows a flow diagram of a method of determining the intensity at a location on a wafer utilizing the frequency domain. Activity 310 comprises solving a transmission cross coefficient (n) (TCC(n)) in the frequency domain to provide a first result. The first result may be determined for TCC(n) in the frequency domain according to the formula above for n from zero to $N_{cut}$, where $N_{cut}$ may be four.

Activity 320 comprises solving the intensity component ($I_n(x, y)$) in the frequency domain. The intensity component may be calculated from the result of activity 310. Activity 320 includes utilizing the formula for the intensity component above.

Activity 330 may include solving the intensity in the frequency domain at a location (x, y) utilizing multiple defocus components. As discussed, utilizing the formula $$I(x,y) = \sum_{n=0}^{N_{cut}} \frac{(-i\pi)^n}{n!} z^n I_n(x,y)$$

allows for relatively quick solutions to multiple defocus values in the tolerance range of focus of interest.

Activity 340 may include utilizing the result of activity 330 to determine if the intensity level will result in the mask pattern being written onto a wafer. By determining the intensity level at a point (x, y), it is possible to determine if the resist for example resist layer 120 of FIG. 1 will have sufficient energy focused on it to either cure or weaken according to the desired effect at the selected region 122. Any defects in the mask pattern may be identified and corrective actions taken to repair the defect.

In addition to calculating the intensity at a location (x, y) in the frequency domain, it may be possible to calculate the intensity at location (x, y) in the spatial domain for multiple defocus values. Calculating intensity in the spatial domain instead of in the frequency domain may reduce the time-consuming step of inverse Fourier transformation as is necessary to calculate each intensity component in the frequency domain.

To solve I(x, y) in the spatial domain, Hopkins' equation for the spatial domain may be expressed as:

$$I(x,y) = \iint TCC(x_1,y_1,x_2,y_2) \tilde{O}(x-x_1,y-y_1) \tilde{O}^*(x-x_2,y-y_2) dx_1 dy_1 dx_2 dy_2,$$

where the transmission cross coefficient in the spatial domain is expressed as TCC($x_1$, $y_1$, $x_2$, $y_2$) and "O" is the mask function.

To solve the transmission cross coefficient in the spatial domain the following formula may be utilized:

$$TCC(x_1,y_1,x_2,y_2) = \tilde{J}(x_2-x_1, y_2-y_1) \tilde{K}(x_1,y_1) \tilde{K}^*(x_2,y_2) \tilde{M}(x_1,y_1) \tilde{M}^*(x_2,y_2).$$

In the above equation, $\tilde{J}(x,y)$, $\tilde{K}(x,y)$, and $\tilde{M}(x,y)$, are source function, pupil function, and polarization function, respectively, expressed in the spatial domain.

Similar to the frequency domain calculations, the space-domain pupil function, $\tilde{K}(x, y)$, focusing on the defocus value "z", may be solved using the inverse Fourier transformation of K(f, g). There may be at least two ways to calculate the pupil function in the spatial domain.

The first way of calculating the pupil function in the spatial domain is a Fresnel integral. While it is more time consuming to solve than the second option, there is an asymptotic evaluation based on the arguments. The expression for the pupil function in the spatial domain is:

$$\tilde{K}(x,y) = FT^{-1}\{K(f,g)\} = \int_{dist(f,g)<1} e^{ik_0(uf^2+ug^2-fx-gy)} df dg,$$

where $$u = \frac{z*NA*NA}{2} \text{ and } FT^{-1}$$

is the inverse Fourier transform.

The second potential solution for the pupil function in the spatial domain is:

$$\tilde{K}(x,y) = FT^{-1}_{dist(f,g)<1}\left\{\sum_k i^k z^k (f^2+g^2)^k \pi^k / k!\right\}$$
$$= \sum_k i^k z^k \pi^k / k! \, FT^{-1}_{dist(f,g)<1}\{(f^2+g^2)^k\}.$$

Substituting the second formula for the pupil function into the calculation for the transmission cross coefficient yields a solution dependent on the defocus value. Similar to the frequency domain calculations, $N_{cut}$ may be limited to four because the value of 1/n! goes to zero quickly as n increases, and the defocus value shall be assumed to be less than or equal to one. Therefore, the resultant transmission cross coefficient in the spatial domain formula may be expressed as:

$$TCC(x_1, y_1, x_2, y_2) = \sum_{n=0}^{N_{cut}} \frac{(-i\pi)^n}{n!} TCC(n) z^n.$$

TCC(n) may be calculated by the formula below:

$$TCC(n) = \sum_{k=0}^{n} (-1)^k C_n^k FT^{-1}_{dist(f,g)<1} \{(f_1^2 + g_1^2)^k\}$$

$$FT^{-1}_{dist(f,g)<1} \{(f_2^2 + g_2^2)^{n-k}\} Cvr(\tilde{J}) b\ln(\tilde{K}) b\ln(\tilde{M}).$$

Cvr is an operator sometimes called the convariance operator, and is defined as $Cvr(J(x, y))=J(x-x_1, y-y_1)$, where x, y, $x_1$, $y_1$ are Cartesian coordinates. As with the frequency domain calculations, $C_n^k$ is found using the formula $$C_n^k = \frac{n!}{k!(n-k)!}.$$

The through focus calculation may be faster in the spatial domain than in the frequency domain, since the spatial domain involves a number of TCC(n) computations without the need of further inverse-Fourier-transformation processing of multiple intensity components, as necessary in the frequency domain.

Figure 4:
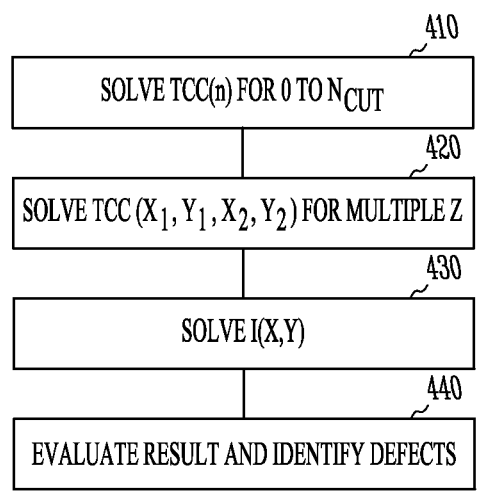
FIG. 4 shows a flow diagram of a method of determining the intensity at a location on a wafer utilizing the spatial domain according to an embodiment of the invention.

FIG. 4 shows a flow diagram of a method of determining the intensity at a location on a wafer utilizing the spatial domain. Activity 410 includes solving the transmission cross coefficient TCC(n). As discussed earlier, the calculation may be limited for n from zero to $N_{cut}$, with a value for $N_{cut}$ of four.

Activity 420 includes calculating the transmission cross coefficient in the spatial domain TCC ($x_1, y_1, x_2, y_2$). TCC ($x_1, y_1, x_2, y_2$) may be solved for multiple "z" in the tolerance range of focus utilizing the result of activity 410. The result of activity 420 may now be applied to activity 430, where the solution for intensity at a location, (x, y), may now be solved.

Activity 440 may include utilizing the result of activity 430 to determine if the intensity level will result in the mask pattern being written onto a wafer. By determining the intensity level at a point (x, y), it is possible to determine if the resist, for example resist layer 120 of FIG. 1, will have sufficient energy focused on it to either cure or weaken according to the desired effect at the selected region 122. Any defects in the mask pattern may be identified and corrective actions taken to repair the defect.

Figure 5:
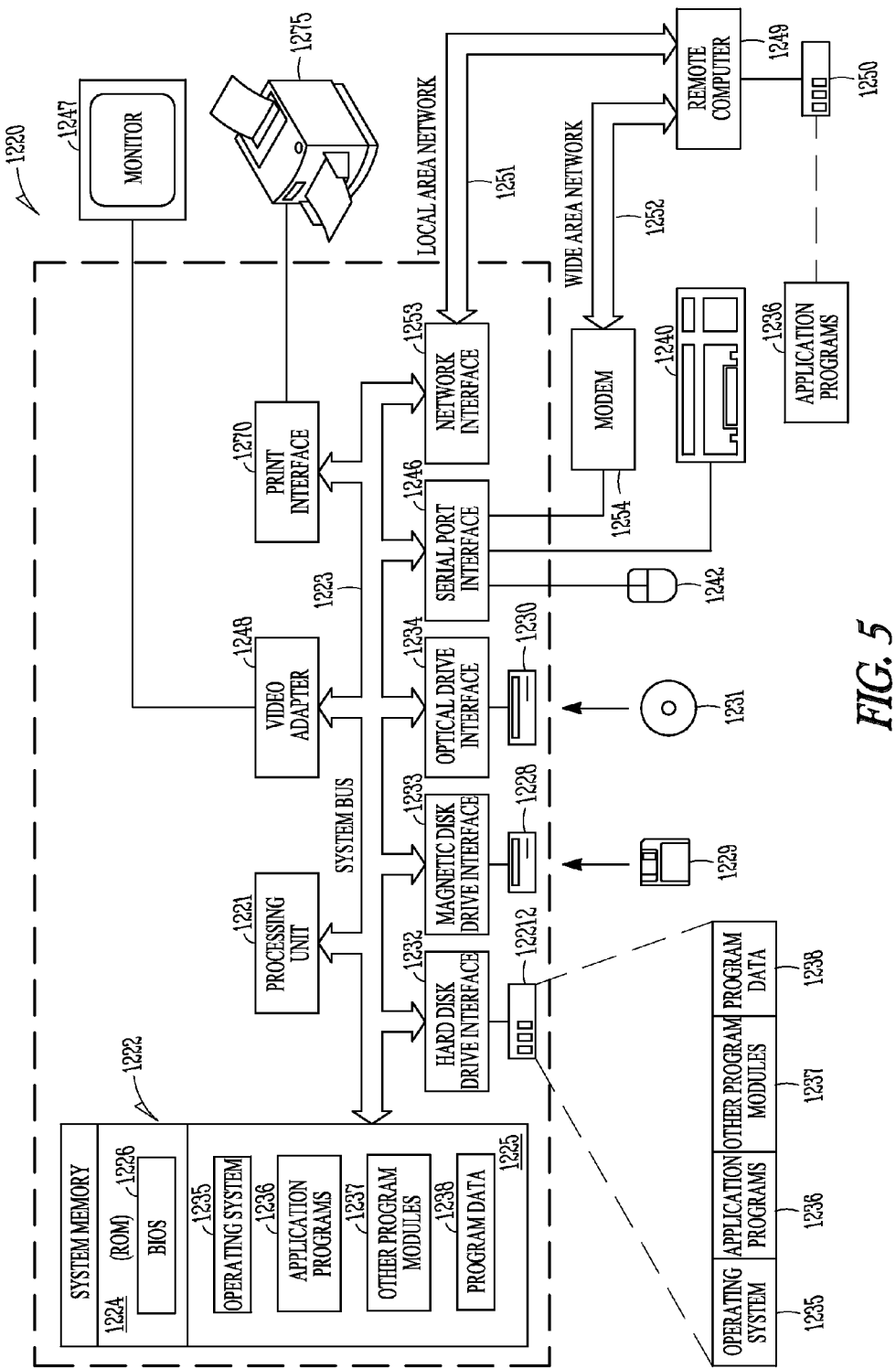
FIG. 5 shows a block diagram of a system including the hardware and operating environment of a suitable computer in conjunction with which embodiments of the invention may be practiced.

FIG. 5 shows a block diagram of a system including the hardware and operating environment of a suitable computer in conjunction with which embodiments of the invention may be practiced. FIG. 5 provides a brief, general description of an example of a suitable computing environment in which the above embodiments may be implemented. Embodiments of the invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. Embodiments of the invention may also be practiced in distributed computing environments where tasks are performed by remote processing devices linked through a communications network. In a distributed computing environment, program modules may be located in both local and remote memory storage devices.

FIG. 5 shows a general-purpose computing device in the form of a conventional personal computer 1220, which includes processing unit 1221, system memory 1222, and system bus 1223 that couples the system memory 1222 and other system components to processing unit 1221. System bus 1223 may be any of several types, including a memory bus or memory controller, a peripheral bus, and a local bus, and may use any of a variety of bus structures. System memory 1222 includes read-only memory (ROM) 1224 and random-access memory (RAM) 1225. A basic input/output system (BIOS) 1226, stored in ROM 1224, contains the basic routines that transfer information between components of personal computer 1220. BIOS 1226 also contains start-up routines for the system. Personal computer 1220 further includes hard disk drive 12212, magnetic disk drive 1228 for reading from and writing to a removable magnetic disk 1229, and optical disk drive 1230 for reading from and writing to a removable optical disk 1231 such as a CD-ROM, DVD or other optical medium. Hard disk drive 12212, magnetic disk drive 1228, and optical disk drive 1230 are connected to system bus 1223 by a hard-disk drive interface 1232, a magnetic-disk drive interface 1233, and an optical-drive interface 1234, respectively. The drives and their associated computer-readable media provide nonvolatile storage of computer-readable instructions, data structures, program modules and other data for personal computer 1220. Although the environment described herein employs a hard disk drive 12212, a removable magnetic disk 1229 and a removable optical disk 1231, those skilled in the art will appreciate that other types of computer-readable media which may store data accessible by a computer may also be used in the operating environment. Such media may include magnetic cassettes, flash-memory cards, digital versatile disks, Bernoulli cartridges, RAMs, ROMs, and the like.

Program modules may be stored on the hard disk drive 12212, magnetic disk 1229, optical disk 1231, ROM 1224 and RAM 1225. Program modules may include operating system 1235, one or more application programs 1236, other program modules 1237, and program data 1238. A user may enter commands and information into personal computer 1220 through input devices such as a keyboard 1240 and a pointing device 1242. Other input devices (not shown) may include a microphone, joystick, game pad, satellite dish, scanner, or the like. These and other input devices are often connected to the processing unit 1221 through a serial-port interface 1246 coupled to system bus 1223, but they may be connected through other interfaces not shown in FIG. 12, such as a parallel port, a game port, a universal serial bus (USB), IEEE 1394 port, etc. A monitor 1247 or other display device also connects to system bus 1223 via an interface such as a video adapter 1248. In addition to the monitor, personal computer 1221 may include other peripheral output devices such as printer 1275. A print interface 1270 may be connected to system bus 1223 and to printer 1275.

Personal computer 1220 may operate in a networked environment using logical connections to one or more remote computers such as remote computer 1249. Remote computer 1249 may be another personal computer, a server, a router, a network PC, a peer device, or other common network node. It typically includes many or all of the components described above in connection with personal computer 1220; however, only a storage device 1250 is illustrated in FIG. 5. The logical connections depicted in FIG. 5 include local-area network (LAN) 1251 and wide-area network (WAN) 1252. Such networking environments are commonplace in offices, enterprise-wide computer networks, intranets and the Internet.

When placed in a LAN networking environment, personal computer 1220 connects to LAN 1251 through a network interface or adapter 1253. When used in a WAN networking environment such as the Internet, personal computer 1220 typically includes modem 1254 or other means for establishing communications over WAN 1252. Modem 1254 may be internal or external to personal computer 1220, and connects to system bus 1223 via serial-port interface 1246. In a networked environment, program modules, such as those comprising Microsoft® Word, which are depicted as residing within PC 1220 or portions thereof, may be stored in remote storage device 1250. Of course, the network connections shown are illustrative, and other means of establishing a communications link between the computers may be substituted.

Embodiments of the invention may be operated by personal computer 1220. Embodiments of the invention may also be incorporated into software and stored on a machine-readable medium which may include system memory 1222, removable magnetic disk 1229, removable optical disk 1231, or storage device 1250 connected to a remote computer 1249, among others. In addition, embodiments of the invention may also be incorporated into existing software code, such as Synopsys' SiVL analysis software. In this manner, software incorporating embodiments of the invention may be distributed.

Figure 6:
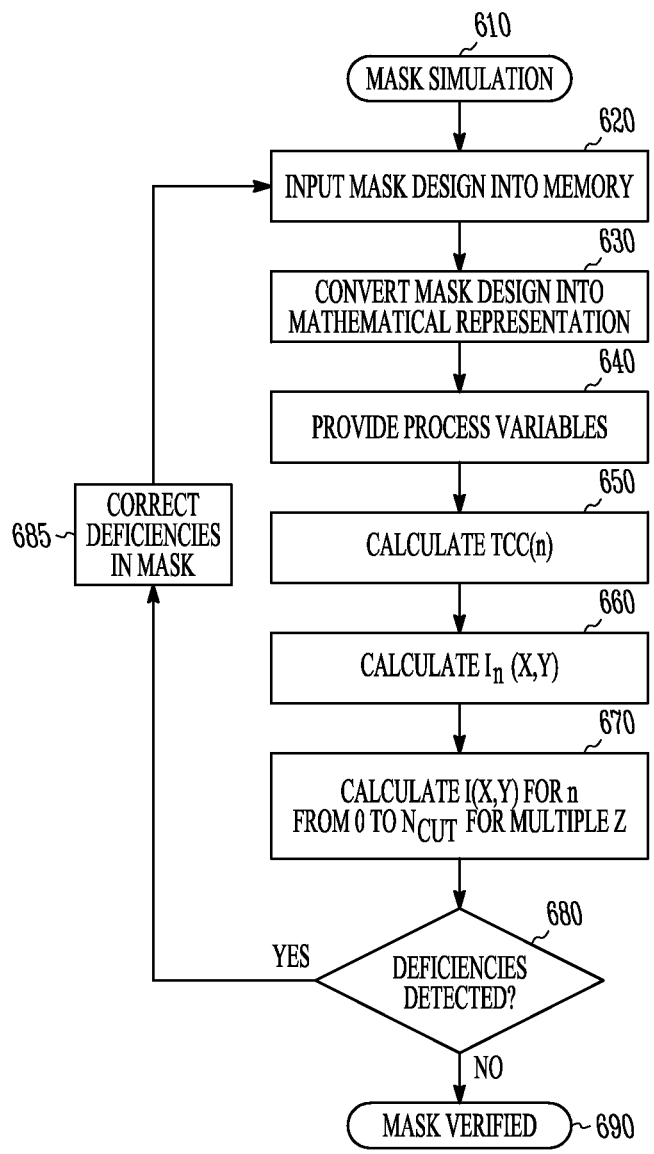
FIG. 6 shows a flow diagram of a method of determining the intensity at a location on a wafer utilizing the frequency domain according to an embodiment of the invention.

FIG. 6 shows a flow diagram of a method of determining the intensity at a location on a wafer utilizing the frequency domain according to an embodiment of the invention. Utilizing a system such as the one disclosed in FIG. 5, a mask may be evaluated and corrections made until the mask design is predicted to manufacture wafers free of errors that may be due to insufficient energy to properly set the resist on the substrate. The flow diagram of FIG. 6 incorporates a system, such as that described in FIG. 5, to simulate a wafer and determine if deficiencies are present according to an embodiment of the invention.

Activity 610 include initiating a mask simulation with a system such as that of FIG. 5. Activity 620 includes loading the mask design into memory such as system memory 1222 or onto the hard disk drive 12212 of FIG. 5. Activity 630 includes having a processor such as processing unit 1221 of FIG. 5 convert the mask design into a mathematical representation. Activity 640 includes inputting or providing the process variables into the system, for example onto system memory 1222 or onto hard disk drive 12212 of FIG. 5. Activity 650 includes having a processor such as processing unit 1221 of FIG. 5 calculate the transmission cross coefficient, TCC(n), in the frequency domain according to a formula such as $$TCC(n) = \sum_{k=0}^{n} (-1)^k C_n^k \int [(f+f_1)^2 + (g+g_1)^2]^k [(f+f_2)^2 + (g+g_2)^2]^{n-k} J(f,g) b\ln(K) b\ln(M) df dg$$

Activity 660 includes having a processor such as processing unit 1221 of FIG. 5 utilize the result of activity 650 to calculate In(x, y) in the frequency domain. In(x, y) may be calculated with a formula such as $$I_n(x,y) = \iint TCC(n) O(f_1,g_1) O^*(f_2,g_2) e^{-i2\pi[(f_1-f_2)x+(g_1-g_2)y]} f_1 dg_1 df_2 dg_2.$$

Activity 670 includes having a processor, such as processing unit 1221 of FIG. 5, use the results of activity 660 to calculate I(x, y) in the frequency domain for n from 0 to $N_{cut}$. The calculation of I(x, y) may be for multiple defocus values "z". The calculation of I(x, y) may use a formula such as $$I(x,y) = \sum_{n=0}^{N_{cut}} \frac{(-i\pi)^n}{n!} z^n I_n(x,y).$$

Activity 680 includes having a processor, such as processing unit 1221 of FIG. 5, determine if any deficiencies in the mask design exist. If no errors exist, activity 690 includes presenting a result to a user that the mask has been verified, for example on a monitor such as monitor 1247 of FIG. 5, or in a printout from a printer such as printer 1275 of FIG. 5.

If a defect is found, activity 685 includes correcting the deficiencies and resubmitting the corrected mask design to activity 620, and repeating the process until a mask free of deficiencies is designed or until the defects are determined to be acceptable.

Figure 7:
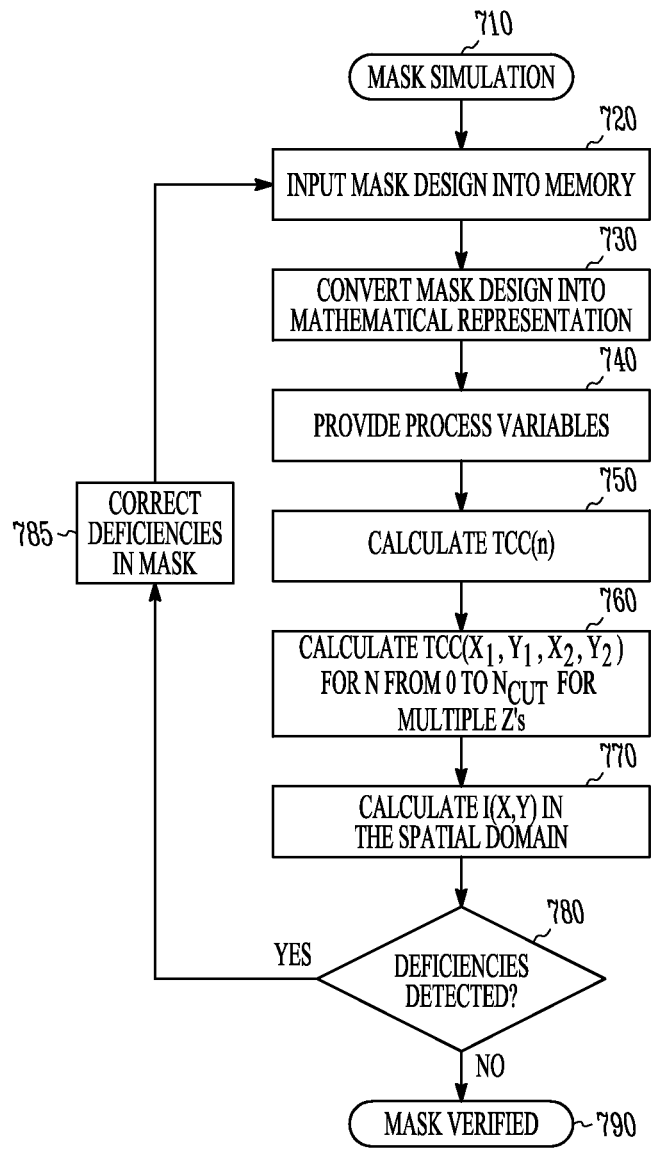
FIG. 7 shows a flow diagram of a method of determining the intensity at a location on a wafer utilizing the spatial domain according to an embodiment of the invention.

FIG. 7 shows a flow diagram of a method of determining the intensity at a location on a wafer utilizing the spatial domain according to an embodiment of the invention. Utilizing a system such as the one disclosed in FIG. 5, a mask may be evaluated and corrections made until the mask design is predicted to manufacture wafers free of errors that may be due to insufficient energy to properly set the resist on the substrate. The flow diagram of FIG. 7 incorporates a system, such as that described in FIG. 5, to simulate a wafer and determine if deficiencies are present according to an embodiment of the invention.

Activity 710 includes initiating a mask simulation with a system such as that of FIG. 5. Activity 720 includes loading the mask design into memory such as system memory 1222 or onto hard disk drive 12212 of FIG. 5. Activity 730 may include having a processor, such as processing unit 1221 of FIG. 5, convert the mask design into a mathematical representation. Activity 740 includes inputting or providing process variables into the system, for example onto system memory 1222 or onto hard disk drive 12212 of FIG. 5. Activity 750 includes having a processor, such as processing unit 1221 of FIG. 5, calculate the transmission cross coefficient, TCC(n), in the spatial domain according to a formula such as $$TCC(n) = \sum_{k=0}^{n} (-1)^k C_n^k \underset{dist(f,g)<1}{FT^{-1}} \{(f_1^2+g_1^2)^k\} \underset{dist(f,g)<1}{FT^{-1}} \{(f_2^2+g_2^2)^{n-k}\} Cvr(\tilde{J}) b\ln(\tilde{K}) b\ln(\tilde{M})$$

Activity 760 includes having a processor such as processing unit 1221 of FIG. 5, utilize the result of activity 750 to calculate $TCC(x_1, y_1, x_2, y_2)$ in the spatial domain. In(x, y) may be calculated with a formula such as $$TCC(x_1, y_1, x_2, y_2) = \sum_{n=0}^{N_{cut}} \frac{(-i\pi)^n}{n!} TCC(n) z^n$$

for n from zero to $N_{cut}$ and for multiple defocus values. Activity 770 includes having a processor, such as processor

1221 of FIG. 5, use the results of activity 760 to calculate I(x, y) in the spatial domain Activity 770 may utilize a formula such as $$I(x,y) = \iint TCC(x_1,y_1,x_2,y_2) \tilde{O}(x-x_1,y-y_1) \tilde{O}^*(x-x_2,y-y_2) \, dx_1 dy_1 dx_2 dy_2.$$

Activity 780 includes having a processor, such as processing unit 1221 of FIG. 5, determine if any deficiencies in the mask design exist. If no errors exist, activity 790 includes presenting a result to a user that the mask has been verified, for example on a monitor such as monitor 1247 of FIG. 5, or in a printout from a printer such as printer 1275 of FIG. 5.

If a defect is found, activity 785 includes correcting the deficiencies and resubmitting the corrected mask design to activity 720, and repeating these steps until a mask free of deficiencies is designed or until the defects are determined to be acceptable.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. A method comprising:
   calculating a transmission cross coefficient (TCC(n)) in a spatial domain for a simulation of a mask pattern to provide a first result;
   calculating a transmission cross coefficient TCC($x_1, y_1, x_2, y_2$) in the spatial domain utilizing the first result to provide a second result;
   calculating intensity at x and y coordinates of a wafer (I(x, y)) in a spatial domain utilizing the second result to provide a third result, wherein calculating at least one of (TCC(n)), TCC($x_1, y_1, x_2, y_2$), and I(x, y) is performed by a processor; and
   reporting a result of an evaluation of the third result, wherein TCC($x_1, y_1, x_2, y_2$) is calculated with an equation $$TCC(x_1, y_1, x_2, y_2) = \sum_{n=0}^{N_{cut}} \frac{(-i\pi)^n}{n!} TCC(n) z^n.$$

2. The method of claim 1, comprising:
   evaluating the third result to determine if the intensity will result in the mask pattern being written onto the wafer.

3. The method of claim 1, comprising:
   calculating TCC($x_1, y_1, x_2, y_2$) with a plurality of defocus values.

4. The method of claim 1, wherein n is an integer and $N_{cut}$ is a number greater than three (3).

5. A method comprising:
   calculating a transmission cross coefficient (TCC(n)) in a spatial domain for a simulation of a mask pattern to provide a first result;
   calculating a transmission cross coefficient TCC($x_1, y_1, x_2, y_2$) in the spatial domain utilizing the first result to provide a second result;
   calculating intensity at x and y coordinates of a wafer (I(x, y)) in a spatial domain utilizing the second result to provide a third result, wherein calculating at least one of (TCC(n)), TCC($x_1, y_1, x_2, y_2$), and I(x, y) is performed by a processor, and
   reporting a result of an evaluation of the third result, wherein TCC(n) is calculated with the formula $$TCC(n) = \sum_{k=0}^{n} (-1)^k C_n^k FT^{-1}_{dist(f,g)<1}\{(f_1^2 + g_1^2)^k\} FT^{-1}_{dist(f,g)<1}\{(f_2^2 + g_2^2)^{n-k}\}$$

$$Cvr(\tilde{J}) b\ln(\tilde{K}) b\ln(\tilde{M}).$$

6. A method comprising:
   calculating a transmission cross coefficient (TCC(n)) in a spatial domain for a simulation of a mask pattern to provide a first result;
   calculating a transmission cross coefficient TCC($x_1, y_1, x_2, y_2$) in the spatial domain utilizing the first result to provide a second result;
   calculating intensity at x and y coordinates of a wafer (I(x, y)) in a spatial domain utilizing the second result to provide a third result, wherein calculating at least one of (TCC(n)), TCC($x_1, y_1, x_2, y_2$), and I(x, y) is performed by a processor, and
   reporting a result of an evaluation of the third result, I(x, y) is calculated with the formula $$I(x,y) = \iint TCC(x_1,y_1,x_2,y_2) \tilde{O}(x-x_1,y-y_1) \tilde{O}^*(x-x_2,y-y_2) \, dx_1 dy_1 dx_2 dy_2.$$

7. A non-transitory machine-readable medium comprising instructions, which when implemented by one or more processors perform the following operations:
   calculating a first transmission cross coefficient (TCC(n)) in a spatial domain for a simulation of a mask pattern to provide a first result;
   calculating a second transmission cross coefficient TCC ($x_1, y_1, x_2, y_2$) in the spatial domain utilizing the first result to provide a second result;
   calculating intensity at x and y coordinates of a wafer in the spatial domain utilizing the second result to provide a third result; and
   calculating TCC($x_1, y_1, x_2, y_2$) with a plurality of defocus values, wherein TCC($x_1, y_1, x_2, y_2$) is calculated with an equation $$TCC(x_1, y_1, x_2, y_2) = \sum_{n=0}^{N_{cut}} \frac{(-i\pi)^n}{n!} TCC(n) z^n.$$

8. The non-transitory machine-readable medium of claim 7, comprising:
   calculating TCC($x_1, y_1, x_2, y_2$) with a plurality of defocus values.

9. The non-transitory machine-readable medium of claim 7, wherein TCC(n) is calculated with the formula $$TCC(n) = \sum_{k=0}^{n} (-1)^k C_n^k FT^{-1}_{dist(f,g)<1}\{(f_1^2 + g_1^2)^k\}$$

$$FT^{-1}_{dist(f,g)<1}\{(f_2^2 + g_2^2)^{n-k}\} Cvr(\tilde{J}) b\ln(\tilde{K}) b\ln(\tilde{M}).$$

10. The non-transitory machine-readable medium of claim 9, wherein I(x, y) is calculated with the formula $$I(x,y) = \iint TCC(x_1,y_1,x_2,y_2)\tilde{O}(x-x_1,y-y_1)\tilde{O}^*(x-x_2,y-y_2)\,dx_1 dy_1 dx_2 dy_2.$$

11. The non-transitory machine-readable medium of claim 10, comprising:
   evaluating the third result to determine if the intensity will result in the mask pattern being written onto the wafer; and
   reporting a result of an evaluation of the third result.

12. The non-transitory machine-readable medium of claim 11, comprising:
   correcting errors in the mask pattern.

13. A system comprising:
   a memory to store a mask pattern; and
   a processing unit to:
      calculate a transmission cross coefficient (TCC(n)) in a spatial domain for a simulation of a mask pattern to provide a first result;
      calculate a transmission cross coefficient TCC($x_1$, $y_1$, $x_2$, $y_2$) in the spatial domain utilizing the first result to provide a second result; and
      calculate intensity at x and y coordinates of a wafer (I(x, y)) in a spatial domain utilizing the second result to provide a third result, wherein TCC($x_1$, $y_1$, $x_2$, $y_2$) is calculated with an equation $$TCC(x_1, y_1, x_2, y_2) = \sum_{n=0}^{N_{cut}} \frac{(-i\pi)^n}{n!} TCC(n) z^n.$$

14. The system of claim 13, wherein the processing unit is to evaluate the third result to determine if the intensity will result in the mask pattern being written onto a wafer.

15. The system of claim 13, wherein the processing unit is to provide a fourth result based on evaluation of the third result.

16. The system of claim 15, comprising a monitor to display the fourth result.

17. The system of claim 15, comprising a media storage device to store the fourth result.

18. The system of claim 13, wherein the processing unit is to correct errors in the mask pattern.

* * * * *